United States Patent Office 3,413,518
Patented Nov. 26, 1968

3,413,518
SLIDING SPARK IGNITION SYSTEM WITH AN INDUCTANCE AND CAPACITOR IN SERIES WITH A THREE ELECTRODE SPARK PLUG
Henry James Chafer, Rugby, England, and Denis Stone, Levin, North Island, New Zealand, assignors to Associated Electrical Industries Limited, London, England, a British company
Filed Jan. 31, 1967, Ser. No. 612,972
7 Claims. (Cl. 315—180)

ABSTRACT OF THE DISCLOSURE

A third electrode of a surface discharge plug which has two main electrodes connected in series with a chargeable capacitor is connected to a point between the said inductance and switching device to complete a path whose impedance at the start of capacitor discharge is above, and during the capacitor discharge automatically decreases below the total actual impedance of the capacitor and discharge device. The three electrodes can form part of a plug device which may also include the inductance. The switching device can be a spark gap, or a controlled semiconductor or rectifier.

---

(1) *Field of the invention.*—This invention relates to ignition of gas turbines and aircraft jet engines.

This invention relates to surface discharge ignition circuits and aims at providing an improved arrangement which ensures with comparatively simple yet effective components a unidirectional pulse discharge, as may be required for instance in gas turbines and aircraft jet engines.

Accordingly this invention resides in an ignition circuit arrangement comprising a series circuit of a switching device, an inductance, a surface discharge plug and a capacitor the latter being connectible to a charging circuit, wherein the discharge plug has a third electrode which is connected to a point between the said inductance and switching device to complete a path whose impedance at the start of capacitor discharge is above, and during the capacitor discharge automatically decreases below the total actual impedance of the capacitor and discharge device.

Thus unidirectional current flow is allowed to continue through the inductance and discharge plug after the capacitor has transferred energy to the inductance, when bypassing the capacitor is ensured, which prevents oscillations.

Preferably the three electrodes of the discharge plug are coaxial, and are separated by insulating or semiconducting members in a fashion to ensure the desired impedance reduction at the end of the capacitor discharge through the plug.

Figure 1:
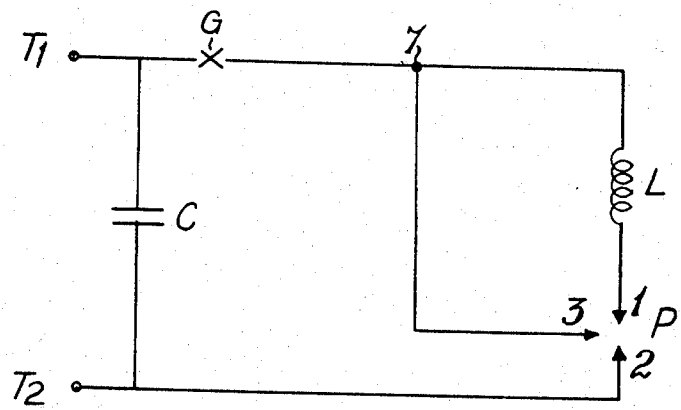
Figure 2:
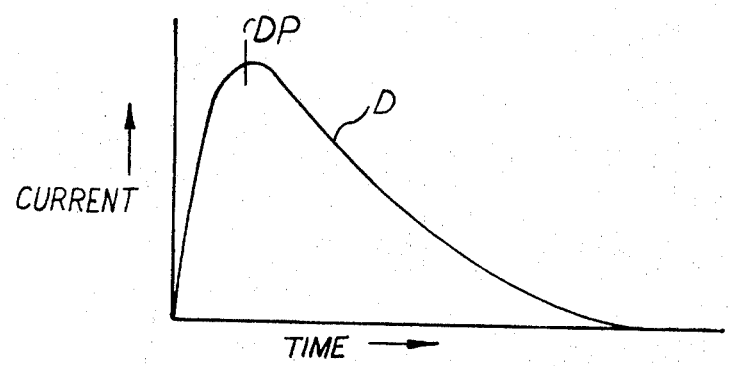
Figure 3:
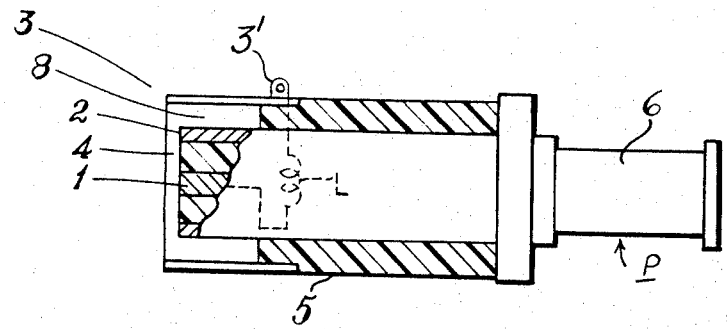

More details will become apparent and the invention will be better understood from the following description referring to the accompanying drawings in which FIG. 1 shows a circuit diagram embodying the invention, FIG. 2 shows a curve with reference to which the operation of the invention will be explained and FIG. 3 shows an exemplary embodiment of a surface discharge plug suitable to be used in accordance with the invention.

Referring to FIG. 1 a surface discharge plug P has two main electrodes 1, 2 connected in series with a capacitor C through an inductance L and a switching device G. D.C. input terminals T1, T2 are connectible to a capacitor charging circuit which is known per se and is not shown for the sake of simplicity. The switching device G may comprise a spark gap, which may be ignitable by a control electrode as known per se. An auxiliary electrode 3 of the plug P is connected to a point 7 between the inductance L and device G to offer a comparatively higher impedance, preventing bypassing the inductance L when the capacitor C discharges, which impedance changes to a lower value at or near zero voltage of the capacitor so that the energy stored in the inductance is diverted from the capacitor and decays to zero round the loop including plug electrodes 1, 3, without significant oscillation.

In the embodiment illustrated by FIG. 3 the discharge plug P comprises a centre electrode 1 separated from a coaxial tubular electrode 2 by a layer 4 which is semiconducting to allow leakage current, and is coextensive with the electrodes 1, 2. A third coaxial electrode 3 of tubular or ring shape is secured to the outside of an insulating or semiconducting sleeve 5. The electrode 3 axially projects beyond the electrodes 1, 2 and the insulation 4, and the end of sleeve 5 is retracted so that an axial additional ionisation zone 8 is formed in the recess between the electrodes 2 and 3. A terminal 3' of the electrode 3 only is shown diagrammatically, while it will be understood that electrodes 1, 2 have conventional terminals and that a supporting body 6 of the plug can be made of a ceramic material as is known.

The operation is as follows: when the leakage current across semiconductor 4 between electrodes 1, 2 suffices to initiate a breakdown of the spark gap G, which is not separately controlled in this case, the energy from the previously charged up capacitor C discharges into the spark plug P. This discharge heats and ionises the gas space between the electrodes 1, 3, and thus produces automatically a comparatively low impedance path for energy discharge from the inductance L when the capacitor voltage falls to zero. Thus undesirable oscillations at the plug P are avoided, the capacitor and spark gap are effectively bypassed, which considerably reduces internal power loss, and a high voltage high current rectifier is not required to effect unidirectional discharge. The arc length between electrodes 1 and 3 can be greater than that of a conventional 2-electrode plug.

In FIG. 2 graph D shows capacitor current plotted against time. At point DP the discharge current reaches its peak, and the capacitor voltage falls to zero. Some energy of the circuit is then stored in the inductance L. Return of this energy to the capacitor, and undesirable discharge oscillations are avoided as circulating current can decay in the lower impedance bypass completed by the auxiliary electrode 3.

While a preferred embodiment has been shown and described, modifications are possible without departing from the invention as defined by the appended claims. A controlled rectifier, of semiconductor type for instance, can be used in lieu of the spark gap G.

If as shown in FIG. 1 the inductance L is outside the plug, the plug has three terminals for connection to the inductance L, the point 7 and the terminal T2 respectively. However as shown dotted in FIG. 3 the inductance L can be incorporated in the plug between the electrodes 1 and 3. Then this device need only have two external terminals, one for connection to the switching device G and the other for connection to the terminal T2 as will be understood with reference to FIG. 1.

1. An ignition circuit arrangement comprising a series circuit of a switching device, an inductance, a surface discharge plug and a capacitor the latter being connectible to a charging circuit, wherein the discharge plug has a third electrode which is connected to a point between the said inductance and switching device to complete a path whose impedance at the start of capacitor discharge is above, and during the capacitor discharge automatically decreases below the total actual impedance of the capacitor and discharge device.

2. An arrangement as claimed in claim 1 wherein the three electrodes form part of a plug device having a centre electrode coaxial with two tubular electrodes, the centre electrode and the inner tubular electrode, near the centre electrode, being separated by an insulator which permits a low leakage current at the igniting voltage of the plug, and the third electrode extending axially beyond the first two electrodes to define an ionisable gas zone between the centre electrode and the third electrode.

3. An arrangement as claimed in claim 2 where an additional ionisable zone is formed in a recess between the third electrode and the end portion of the inner tubular electrode.

4. An arrangement as claimed in claim 2 wherein the inductance is included in the plug device, said device having two terminals, one for connection to the switching device and the other for connection to that one of the two capacitor terminals which is remote from the switching device.

5. An arrangement as claimed in claim 1 wherein the switching device comprises a spark gap.

6. An arrangement as claimed in claim 5 wherein the spark gap includes a control electrode and a means is provided for applying a signal to the control electrode for igniting the spark gap.

7. An arrangement as claimed in claim 1 wherein the switching device comprises a controlled rectifier of a semiconductor type.

References Cited

UNITED STATES PATENTS

| | | | |
|---|---|---|---|
| 2,799,809 | 7/1957 | Lautenberg | 315—241 X |
| 2,807,376 | 1/1959 | Tognola | 313—131 X |
| 2,963,620 | 12/1960 | Knudson et al. | 313—131 X |
| 2,963,624 | 12/1960 | Meyer et al. | 315—209 |
| 3,049,644 | 8/1962 | Bowlus et al. | 315—219 |
| 3,248,602 | 4/1966 | Irish et al. | 315—243 X |

JAMES W. LAWRENCE, *Primary Examiner.*

C. R. CAMPBELL, *Assistant Examiner.*